INVENTOR.
JOHN A. RICHARDS
BY
ATTORNEYS

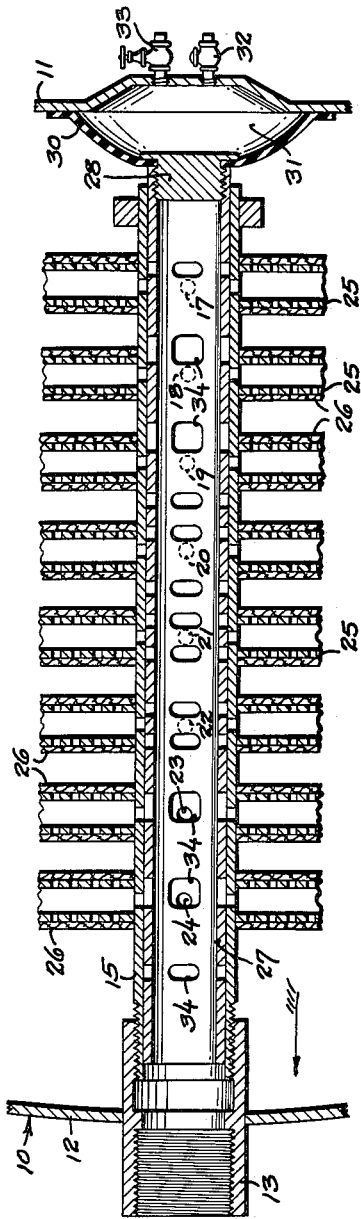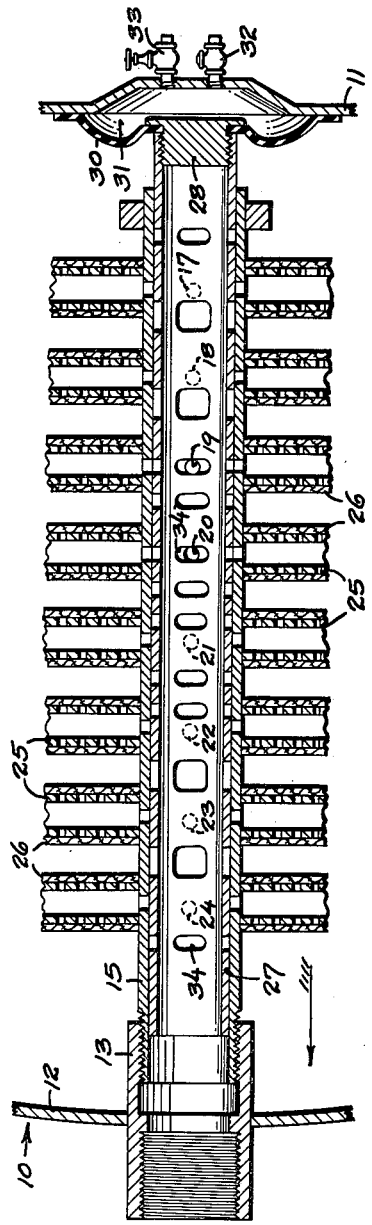

Jan. 11, 1966  J. A. RICHARDS  3,228,524
BACKWASHING CONTROL FOR MULTIPLE-SEPTUM FILTER BED
Filed July 25, 1961  4 Sheets-Sheet 3

INVENTOR.
JOHN A. RICHARDS
BY
ATTORNEYS

United States Patent Office 3,228,524
Patented Jan. 11, 1966

3,228,524
BACKWASHING CONTROL FOR MULTIPLE-SEPTUM FILTER BED
John A. Richards, 3525 E. 93rd, Seattle, Wash.
Filed July 25, 1961, Ser. No. 126,587
3 Claims. (Cl. 210—138)

This invention relates to filter systems, particularly one which calls for backwashing as a means of periodically ridding the filter bed of accumulated dirt, and which is characterized in that, during the filtering cycle, the water which is to be filtered is fed under pump pressure to a filter tank and there distributed over a plurality of filter beds which funnel into a common outlet but are otherwise independent of one another. The invention especially lends itself to that type of filter system in which a slurry of diatomaceous earth is fed into the filter stream so as to deposit itself as a filter coating upon filter cloth or other like or suitable material which constitutes the bed proper, and wherein the pump pressure, during the backwashing cycle, when divided among said several beds is insufficiently high to effectively remove the diatomaceous coating therefrom preparatory to the substitution of a clean coating therefor.

For its general object the present invention aims to provide a means and method by which, during a backwashing cycle, the beds of the filter tank are divided into groups of which each group is composed of a number of beds less than the whole having a combined areal compass predetermined as being within the effective backwashing capabilities of the concerned pump, and the backwashing water is then successively concentrated upon each of said groups of beds in turn.

It is a further and particular object to provide a system of the described character in which the cycling action is made automatic.

The foregoing and other objects and advantages in view will appear and be understood in the course of the following description and claims, the invention consisting in the perfected filtering system, and in the novel construction, adaptation and combination of the parts of said system, hereinafter described and claimed.

In the accompanying drawings:

FIGS. 2 and 3 are fragmentary longitudinal vertical sectional views thereof with the movable parts shown in the positions occupied at two stages of a backwashing cycle.

Figure 1:
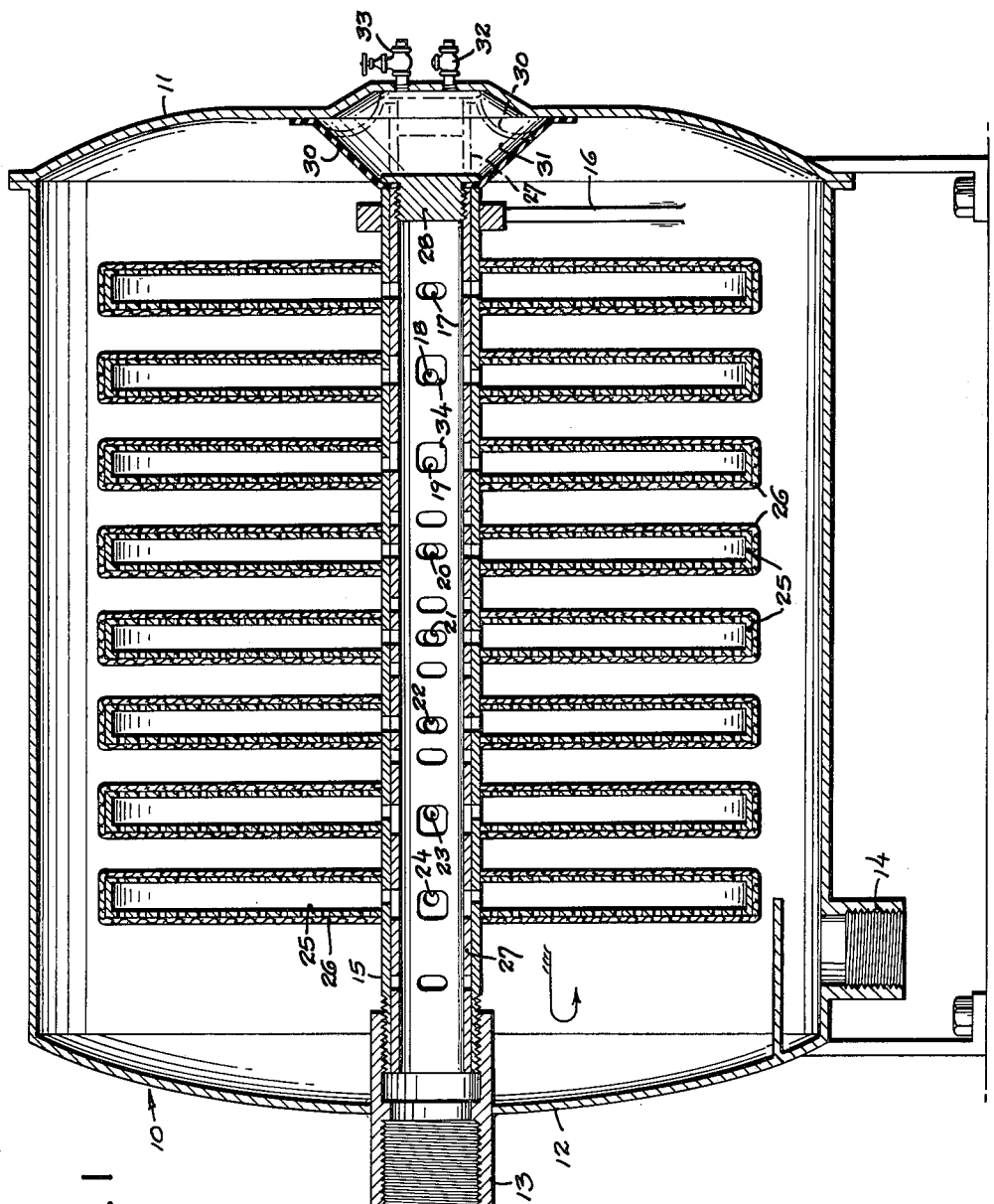
FIGURE 1 is a longitudinal vertical sectional view illustrating a filter tank constructed to embody preferred teachings of the present invention, with full and broken lines representing the positions occupied by movable parts at the completion of a backwashing cycle and the inception of a filtering cycle, respectively.
Figure 4:
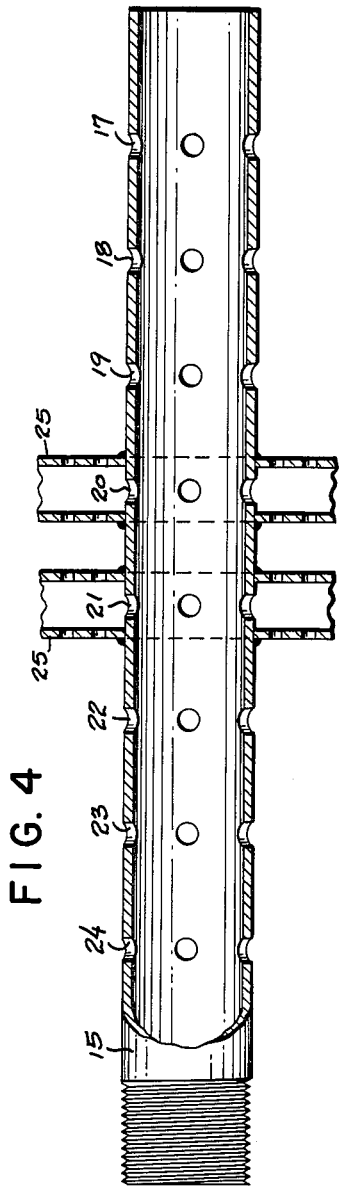
FIG. 4 is a fragmentary enlarged-scale view partly in elevation and partly in longitudinal vertical section illustrating the filter septums and a manifold to which the same are fixedly attached.
Figure 5:
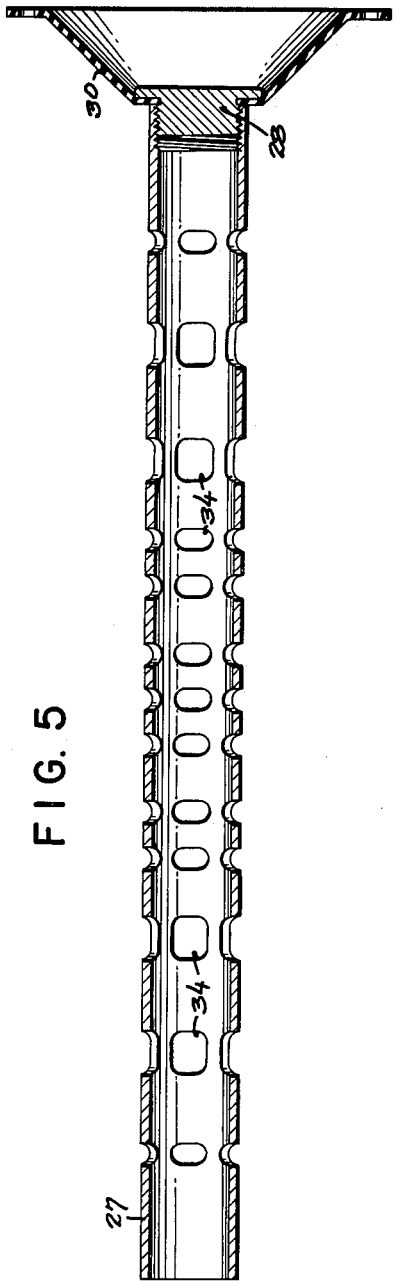
FIG. 5 is a similarly enlarged longitudinal vertical sectional view detailing a diaphragm and associated shuttling valve which govern the distribution of the pumped water.

Referring to said drawings, the numeral 10 designates a filter tank which is or may be cylindrical in form. One end wall 11 of such tank, hereinafter referred to as the back wall, is removably secured in order to give access to the interior, and there is provided in the opposite or front wall 12 a fitting 13 interiorly threaded at both ends and serving in the normal use of the tank as an egress opening. A fitting 14 interiorly threaded at its outer end is provided in a side wall of the tank and normally serves as an ingress opening.

A cylindrical pipe manifold 15 which is open at both ends threads into the fitting 13 and extends therefrom axially of the tank to a point proximate to but spaced from the back wall 11. This manifold has its inner end stabilized by a strut 16. The manifold provides a plurality of ports spaced at equidistant intervals of the length. Here shown as eight in number the ports are designated by 17, 18, 19, 20, 21, 22, 23 and 24. Each such port leads to the hollow interior of a respective disc-like filter septum 25. These septums are rigidly mounted upon the manifold and are each of a foraminous nature covered with filter cloth 26.

A tubular shuttle valve 27 is given a sliding fit within said manifold. Such valve has a length approximating that of the manifold and is open at the front end. A plug 28 threads into the back end of the valve and, in addition to closing said back end, clamps the valve to one end of a diphragm 30. The other end of the diaphragm, which has its axis coinciding with that of the valve, is fixedly secured to the tank's back wall 11. A chamber 31 sealed from the interior of the tank is thus formed at the rear end of the tank and is subject to expansion and contraction as the diaphragm moves. This movement is accomplished by changes in pressure conditions which obtain within the tank and will be hereinafter described in course of tracing the operation of the system. Said chamber 31 is an air chamber and communicates with the atmosphere by two valves 32 and 33. Valve 32 is a check-valve opening in an outward direction. Valve 33 allows air to enter the chamber but is a throttling valve so adjusted that air can only "bleed" through the same, i.e. permit only a very restricted flow.

Reverting to the shuttling valve, there are provided in the wall thereof a plurality of ports 34 so placed that at each of the two extremes of the valve's reciprocal travel each of said ports is in communication with one of the eight manifold ports. Thus, in these two extreme positions all of the septums are brought into communication with the hollow interior of the shuttle valve. Between said two extremes the valve ports 34 progressively register with the ports of the manifold so that communication between the interior of the valve and the hollow centers of the septums is in successive sets, two septums to a set. This is to say, as the valve moves from right to left as viewed in each of FIGS. 1, 2 and 3, that ports 34 of the valve register first only with the two ports 17 and 18, then in succession with the two ports 19–20, 21–22, 23–24, and finally all ports 17–18–19–20–21–22–23–24. Ports 34, as the valve returns from left to right, traverse the ports of the manifold 15 in reverse order, but during travel in this direction the number of ports uncovered at any one time is unimportant. It is important, however, that communication becomes again established betwen the interior of the valve and all of the septums 25 as the plug 28 prescribes for the valve 27 an end limit of travel by bottoming against the back wall 11. As above stated, all of the ports of the manifold are thereby brought into registration with a respective one of the ports 34. This one of the two extreme positions of the shuttle valve is shown by broken lines in FIG. 1 and is the location normally occupied by the shuttle valve. The other extreme position, and which is or may be occupied only momentarily, is shown by full lines in FIG. 1. The travel toward said momentarily occupied extreme position occurs in consequence of backwashing the filter beds, and is accomplished by creating a suction condition within the tank 10 by the act of imposing a suction force upon a pipe 36 of the filter system which connects with the ingress fitting 14. This pipe is normally the ingress pipe. By reason of the restriction of the air flow through valve 33 to the air chamber 31 said suction-induced (right-to-left) travel speed of the shuttling valve is slow. The speed of return (left-to-right) travel is relatively fast in that air within the chamber is freely expelled through the check valve 32. Such return motion is accomplished by reversing the flow through said pipe 36 which perforce establishes a pressure condition within the filter tank.

Figure 6:
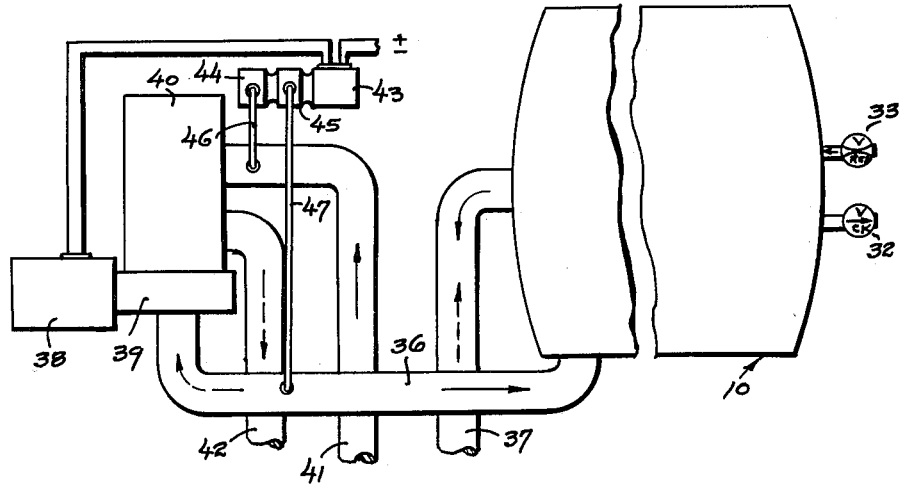
FIG. 6 is a schematic illustration of an indicative system incorporating said filter tank.

Describing the filter system as it is illustrated in FIG. 6, a pipe 37 leads from the fitting 13 to the swimming pool or other body of water which is to be filtered. Pipe 36 which, as above stated, leads to the fitting 14 connects by its other end with one side of a reversible pump 39 powered from a reversible electric motor 38. The other side of the pump connects with a hair catcher 40. A pipe 41 leads to the hair catcher from the pool, and a pipe 42 leads from the hair catcher to waste. Time, vacuum and pressure switches 43, 44 and 45, respectively, govern the operation of the motor 38, with switches 43 and 44 being made subject to the pressure conditions obtaining in the pipes 41 and 36, respectively, by means of a connection 46 in the one instance and a connection 47 in the other instance. The hair catcher and the reversible pump illustrated and described in my pending application to Means and Method for Backwashing Filter Bed, Ser. No. 103,947, filed April 18, 1961, now Patent No. 3,138,552, are suitable for use in the automatic system portrayed in FIG. 6.

Tracing the operation of said automatic system, let it be assumed that the pump is operating in its normal pumping direction. In this case the course of the pumped water is as shown by the full-line arrows, with the water being taken by pipe 41 from the pool into the hair catcher 40 and forced therefrom through pipe 36 into the filter tank exteriorly of the filter septums. Diatomaceous earth is added at some point between the pool and the suction side of the pump, and reaching the filter tank as a slurry is deposited as a filter coating upon the filter cloth. Back pressure (higher than atmospheric) created by the resistance to flow of the coated filter elements produces a pressure rise within the tank, whereupon diaphragm 30 moves rapidly in a rearward (left-to-right) direction into the position shown by broken lines in FIG. 1. All ports in the manifold are now in registration with ports of the shuttle valve. Water filters through all of the filter beds into the hollow center of the shuttle valve and thence issues through fitting 13 to flow by pipe 37 into the pool.

The nature and functioning of the three switches 43, 44 and 45 should perhaps be here more particularly considered before proceeding with a description of the operation of the shuttle valve. The timer switch 43 has two positions. In its normal position it completes for the reversible motor 38 an electric circuit responsible for turning the latter in the direction which causes pump 39 to draw water through pipe 41 and force the same through pipe 36 to the filter tank. In its other position it completes an electric circuit which turns the motor in the opposite, or reversing direction, so that the pump responsively draws from the filter tank through conduit 36 and feeds same through conduit 42 to "waste." The timer switch is relay-operated from said first or normal position into said second or "reversing" position by the activation of either the pressure switch 45 or the vacuum switch 44, and is characterized in that a timing cycle commences coincident with its movement into "reversing" position. The duration of this timing cycle is predetermined, and at the expiration thereof the timer switch is automatically returned to said first or normal position. A rise of pressure within conduit 36, to a predetermined level, and sensed by means of the pipe 47, activates the pressure switch 45. The cause of this pressure rise is a given resistance imposed by the filter septums in consequence of becoming unduly coated with foreign matter. A drop of pressure within conduit 41, to a predetermined level, and sensed by means of the pipe 46, activates the vacuum switch 44. The cause of this pressure drop is an undue resistance to water flow imposed by an excess of foreign matter having been collected on the screen of the hair catcher 40. Thus, reversal of the pump's pumping direction takes place automatically should either the filter septums or the hair-catching screen become unduly loaded with foreign matter. The reversed pumping continues for the time interval prescribed by the timer of the timing switch. Normal pumping thereupon again takes over, being an automatic function of the timer switch.

Reverting now to a description of the operation of the shuttle valve, the system continues to operate with the valve in its normal position until sufficient dirt has collected on the filter coating to create a rise in the back pressure to a predetermined level indicating need for replacement of the coating. This pressure, passed as described back through pipe 36 and carried by tubing 47 to the pressure switch 45, automatically reverses the rotation of the pump 39.

Upon such reversal, the water flow is in the direction shown by broken-line arrows in that the pump now subjects pipe 36 to suction force. The resistance to flow of water through the septum elements develops a vacuum within the tank and this vacuum, acting on the diaphragm 30, tends to pull the same toward the front wall 12, and namely in a "right-to-left" direction. The rate of travel, however, is quite slow in that the check valve 32 closes and air is enabled to bleed into chamber 31 only through the restricted opening for which the needle of the throttling valve 33 has been set. As such gradual movement takes place, the shuttling valve moves in concert and first brings the hollow interior of the shuttling valve into communication with only two of the septums, namely those fed by ports 17 and 18. Progressively in turn, the water flow is limited to only pairs of said septums so that all of the pump volume is concentrated throughout the backwash cycle upon successive sets of two septums. Considered on a square-footage basis, each of the two septums of the successively backwashed pairs receive one-half of the pump's total volume of pumped water. However, the actual backwashing force is usually even higher in that a reduced discharge head is customarily designed into backwash piping.

Upon completion of the shuttle's "right-to-left" travel, with the diatomaceous earth coatings having in the course of such travel been discharged into the backwash stream and carried through conduit 42 to waste, all ports are brought into communication. The settings given to the timer of the timer switch and to the trickle valve 33 is such that when the timing cycle has elapsed the "right-to-left" travel of the shuttle valve will have been completed. As previously described, such expiration of the timing cycle serves to trip the time switch 43, which acts upon the motor 38 to reverse the rotation of the pump so that the water flow is as first described, namely from the pool through pipe 41 and hair catcher 40 to the pump 39 and thence by pipe 36 to the filter tank, whereupon diaphragm 30 rapidly moves to the outer extreme of its permitted travel and filtering again proceeds as water works through all of the septums into the hollow interior of the shuttling valve and thence by pipe 37 into the pool. It will have been understood that the time switch controls the motor and is activated by either the vacuum switch 44 or the pressure switch 45. In either case, such time switch reverses the pump motor for a pre-set period of time and then returns the pump motor to normal rotation. It is self-evident that a limit switch could be employed in lieu of the time switch to reverse the pump when the shuttling valve reaches its rear limit of travel upon completion of a backwashing cycle. Clean diatomaceous earth will have been charged into the water stream automatically upon said reversal of flow so as to again coat the septums. I illustrate and describe a suitable means for charging the filter media in my above-identified pending patent application.

Figure 7:
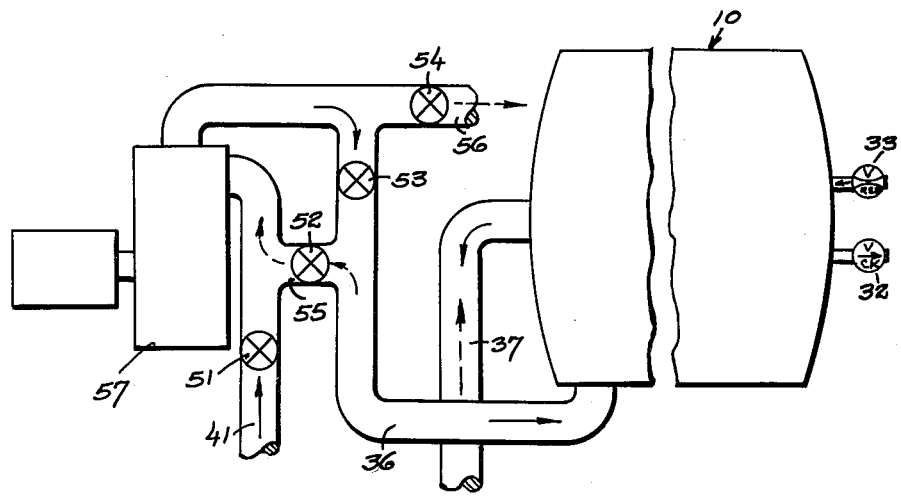
FIG. 7 is a schematic illustration of a second indicative system.

In FIG. 7 I have illustrated a system employing a standard centrifugal pump 50 in lieu of the reversing pump 39. The operation is here identical excepting that valving, which may be either manual or automatic, is employed rather than a reversal of the pump. Four valves 51, 52, 53 and 54 are incorporated in the system, and a cross-over 55 is provided between pipes 41 and 36 which connect with the hair catcher 57 at opposite sides of a strainer contained therein. The valve 51 is fitted in pipe 41 in advance of the latter's juncture with the cross-over. Valve 52 is fitted in the cross-over. Valve 53 is fitted in pipe 36 between the hair catcher 57 and said cross-over. Valve 54 is fitted in a waste pipe 56 which branches off from the pipe 36 between said valve 53 and the hair catcher 57. To initiate a filter cycle the valves 51 and 53 are opened, and valves 52 and 54 are closed. To initiate a backwash cycle, the valves 52 and 54 are opened and valves 51 and 53 are closed. It should perhaps be noted that the system of FIG. 7 does not adapt itself to a cleaning of the hair-catching strainer simultaneously with the backwashing of the filter beds, as is accomplished with the system shown in FIG. 6.

While less advantageous, it will be apparent that the diaphragm can be dispensed with and its functions performed by a control governed either electrically, hydraulically or pneumatically.

It is thought that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A filter system comprising, in combination: a filter tank providing a chamber having inlet and outlet openings separated by a plurality of filter beds each presenting a filtering surface on which dirt filtered from liquid forced through said tank in the course of a filtering run is deposited as a coating, means operating in cycles for pumping said liquid through the tank with the liquid entering via the inlet opening in one cycle and via the outlet opening in another cycle so as in the former instance to filter the liquid and in the latter instance to backwash the filter beds, a valving means including a reciprocally movable shuttle valve and means to connect said shuttle valve with the filter beds such that when the shuttle valve moves through one stroke of its reciprocatory movement from a normally occupied localized position at one extreme thereof the backwash cycle is performed in successive stages which are all of equal duration and during each of which stages separate groups of beds are backwashed by the pumped liquid with each group composed of a respective given number of the beds less than the whole and when the shuttle valve has returned to said normal position the filtering cycle is then performed in a single stage during which all of the beds are concurrently traversed by the pumped liquid, an air chamber within said tank chamber, said air chamber including two openings to communicate said air chamber with the atmosphere, a diaphragm having one side exposed to the pressure which obtains within the tank chamber between the filter beds and the opening through which liquid to be filtered enters the chamber and having its other side exposed to the pressure which obtains in said air chamber, one of said openings having means to permit atmospheric air to enter the air chamber at a choked rate of volumetric flow, the other of said openings having a fitting means therein permitting return unidirectional flow to the atmosphere at a fast volumetric rate, and a connection means between the diaphragm and the valving means for giving to the valving means its said reciprocal movement such that the valving means responsively moves from said normal localized position when atmospheric air enters the air chamber and responsively returns to said localized position when said air returns to atmosphere.

2. Structure according to claim 1 in which the tank chamber, between the filter beds and the opening through which liquid to be filtered enters the chamber, is subjected by the pumping means to a high pressure condition during the filtering cycle and a suction condition during the backwashing cycle.

3. A filter system comprising, in combination: a filter chamber containing a filter bed comprised of a plurality of filter septums each faced with a replaceable layer of filter media, said chamber having one opening which normally serves as an outlet and a second opening which normally serves as an inlet and through which liquid to be filtered is supplied to the filter chamber exteriorly of said facing media, a manifold providing a plurality of ports each communicating with the interior of a respective one of the septums and leading by a common passageway to said opening which serves normally as an outlet, means for pumping liquid through said chamber in either direction selectively so as to filter the liquid when it is pumped in one direction and to backwash the filter bed when it is pumped in the other direction, a valving means for the manifold, and automatically acting means for operating said valving means so that a given plurality of said ports are opened collectively when the direction of pumping is such as to filter the liquid and opened individually in timed sequence when the direction of pumping is such as to backwash the filter bed, the manifold comprising a cylindrical pipe, the valving means comprising a tubular spool journaled for endwise shuttling motion within the manifold, the spool sequentially opening the individual ports of the manifold in course of its endwise travel and opening all of said ports at one end limit of such travel, the automatically acting means also coacting with the spool to move the spool at a comparatively slow speed when moving from and at a comparatively fast speed when moving toward said end limit of travel.

References Cited by the Examiner

UNITED STATES PATENTS

| 402,738 | 5/1889 | Hyatt | 210—333 |
|---|---|---|---|
| 2,300,849 | 11/1942 | Tauch | 210—82 |
| 2,306,746 | 12/1942 | Niesemann | 137—116.5 |
| 2,441,526 | 5/1948 | Zollinger | 210—108 |
| 2,835,390 | 5/1958 | King | 210—82 |
| 2,954,873 | 10/1960 | Davis | 210—333 |
| 2,981,416 | 4/1961 | Lawler | 210—333 |
| 3,012,573 | 12/1961 | Peterson | 137—505.46 |
| 3,061,100 | 10/1962 | Fehlmann | 210—108 |
| 3,149,070 | 9/1964 | Nash | 210—333 |

OTHER REFERENCES

Bruins et al.: Patent Abstract of Serial No. 707,212, published Sept. 2, 1952.

REUBEN FRIEDMAN, *Primary Examiner.*

RONALD R. WEAVER, CHARLES SUKALO,
*Examiners.*